United States Patent
Hayes et al.

(10) Patent No.: US 7,529,012 B2
(45) Date of Patent: May 5, 2009

(54) DISPLAY DEVICE

(75) Inventors: Robert A. Hayes, Eindhoven (NL); Bokke J. Feenstra, Eindhoven (NL); Leendert M. Hage, Eindhoven (NL); Ronald M. Wolf, Eindhoven (NL); Ewout V. Morks, Delft (NL); Patrice G. C. Jaulneau, Paris (FR); Ivo G. J. Camps, Eindhoven (NL); Lucas J. M. Schlangen, Eindhoven (NL)

(73) Assignee: Liquavista B.V., At Amstelveen (NL)

( * ) Notice: Subject to any disclaimer, the term of this patent is extended or adjusted under 35 U.S.C. 154(b) by 90 days.

(21) Appl. No.: 10/557,378

(22) PCT Filed: May 13, 2004

(86) PCT No.: PCT/IB2004/050693

§ 371 (c)(1),
(2), (4) Date: Jan. 26, 2007

(87) PCT Pub. No.: WO2004/104670

PCT Pub. Date: Dec. 2, 2004

(65) Prior Publication Data

US 2007/0127108 A1    Jun. 7, 2007

(30) Foreign Application Priority Data

May 22, 2003  (EP)  .................. 03101479

(51) Int. Cl.
G02B 26/02  (2006.01)
(52) U.S. Cl. .................................... 359/228
(58) Field of Classification Search .................. 359/228
See application file for complete search history.

(56) References Cited

U.S. PATENT DOCUMENTS

| 4,079,368 A | 3/1978 | DiStefano |
| 4,582,391 A | 4/1986 | Legrand |

(Continued)

FOREIGN PATENT DOCUMENTS

| EP | 1 069 450 A2 | 1/2001 |
| WO | 03/034748 A | 4/2003 |

(Continued)

OTHER PUBLICATIONS

International Search Report for PCT/IB2004/050693 mailed Sep. 6, 2004.

(Continued)

*Primary Examiner*—Euncha P Cherry
(74) *Attorney, Agent, or Firm*—Nixon & Vanderhye PC

(57) ABSTRACT

An optical switch, e.g., a display device based on layer break up or layer displacement having at least two different states, in which one of the fluids, e.g., oil in a first state, adjoins at least a first support plate and, in the second state, the other fluid at least partly adjoins the first support plate, in which picture elements are separated by areas having a hydrophilic surface.

13 Claims, 2 Drawing Sheets

U.S. PATENT DOCUMENTS

| | | |
|---|---|---|
| 5,757,345 A | 5/1998 | Sheridon |
| 5,956,005 A | 9/1999 | Sheridon |
| 6,268,092 B1 | 7/2001 | Akashi et al. |
| 6,369,954 B1 | 4/2002 | Berge et al. |
| 6,603,444 B1 | 8/2003 | Kawanami et al. |

FOREIGN PATENT DOCUMENTS

| | | |
|---|---|---|
| WO | WO03/071346 A1 | 8/2003 |

OTHER PUBLICATIONS

Patent Abstracts of Japan, vol. 0182, No. 68 (C-1202) & JP 6 041337 A (1994).

Patent Abstracts of Japan, vol. 0144, No. 75 (C-0770) & JP 2 196834A (1990).

International Search Report dated Jun. 2, 2003, issued in corresponding PCT/IB 03/00196.

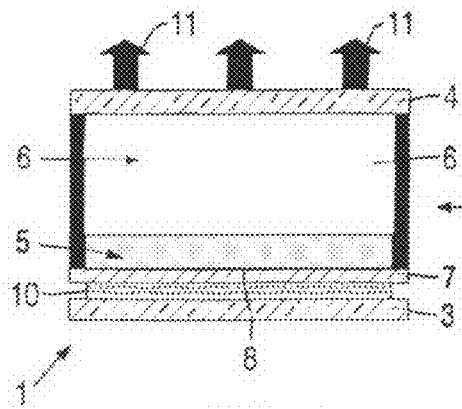
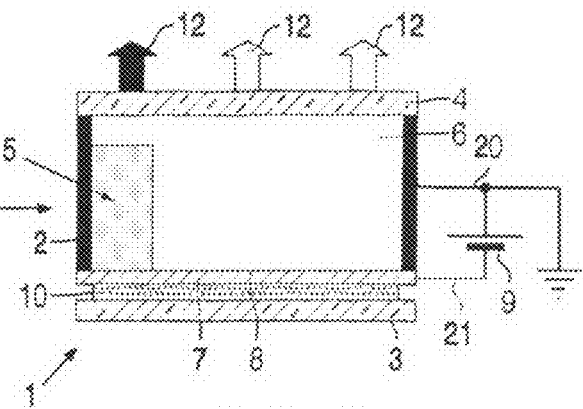
FIG. 1a    FIG. 1b
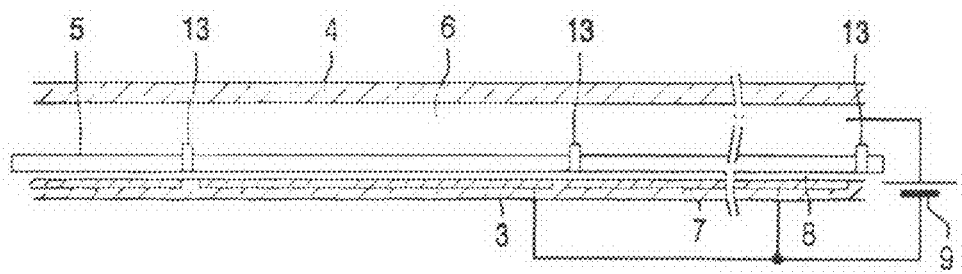
FIG. 2
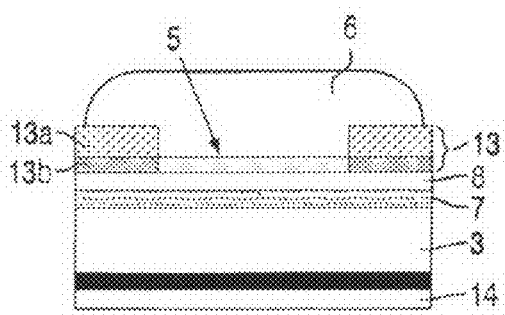
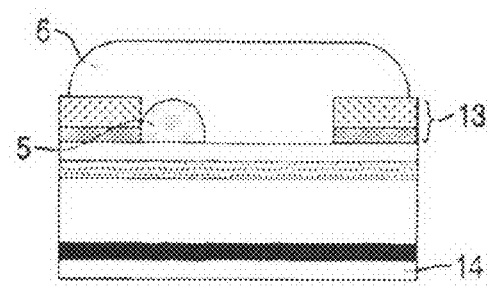
FIG. 3a    FIG. 3b

DISPLAY DEVICE

BACKGROUND

1. Technical Field

The invention relates to an optical switch comprising at least one first fluid and a second fluid immiscible with each other within a space between a first transparent support plate and a second support plate, the second fluid being electroconductive or polar.

In particular the invention relates to a display device comprising picture elements (pixels) having at least one first fluid and a second fluid immiscible with each other within a space between a first transparent support plate and a second support plate, the second fluid being electroconductive or polar.

2. Related Art

Optical switches may be used in shutter applications, diaphragms, but also in switchable color filters in e.g. display applications.

Display devices like TFT-LCDs are used in laptop computers and in organizers, but also find an increasingly wider application in GSM telephones. Instead of LCDs, for example, (polymer) LED display devices are also being used.

Apart from these display effects that are well established by now other display techniques are evolving like electrophoretic displays, which are suitable for paper white applications.

The invention is based on a principle called electro-wetting. The invention provides new ways of using this principle in which one of the fluids in a first state adjoins a greater part of the first support plate and in the second state the other fluid at least partly adjoins the first support plate.

If for instance a (first) fluid is a (colored) oil and the second (the other) fluid is water (due to interfacial tensions) a two layer system is provided which comprises a water layer and an oil layer. However, if a voltage is applied between the water and an electrode on the first support plate the oil layer moves aside or breaks up due to electrostatic forces. Since parts of the water now penetrate the oil layer the picture element becomes partly transparent.

Display devices based on this principle have been described in PCT-Application WO 03/071346. In most of the embodiments shown in this Application, a picture element corresponds to a defined space (e.g., a substantially closed space) and, in the second state, the other fluid substantially completely adjoins the first support plate. In one embodiment shown in this Application, picture elements are described in which the pixel walls do not extend across the whole pixel thickness.

In practice however these pixel walls have a certain wall height of about 80 µm or more which has severe implications for the optical performance of small pixels in particular. The presence of such pixel walls results in an effectively reduced pixel area, since the area close to the walls does not contribute to the pixel brightness at the higher incoming angles. As a result, the total pixel will become less bright. This reduction of brightness will be more severe for smaller pixels. At a wall height of about 80 µm, the loss of brightness is about 10-15% for a 500 µm×500 µm pixel.

Moreover the walls are generally glued to the underlying surface. This underlying surface is often a fluoropolymer surface so the bonding is rather weak mechanically due to the fact that the fluoropolymer is very hydrophobic. Also the glue in between the walls and the fluoropolymer surface tends to move into the pixel area. In this case, the oil will not cover this part of the pixel, since the oil is repelled from the glue surface. These areas cause a considerable increase in reflectivity in the "black" off-state, thereby reducing the optical contrast.

SUMMARY

It is one of the objects of the present invention to overcome at least partly the above mentioned problems.

To this end an optical device according to the invention comprises at one support plate within said space a surface area less wettable for the second fluid, the less wettable surface area being surrounded by areas having a more wettable surface area.

Although not strictly necessary the less wettable surface area is preferably separated by more wettable surfaces provided on walls.

By lowering the walls to 20 µm thickness, or less, the device can be operating in a range where the oil height upon contraction is in fact larger than the actual wall height. The inventors have experimentally confirmed that the oil remains within the pixel, due to the pinning of the oil/water interface at the bottom of the wall. In display applications the possibility of oil in adjacent pixels mixing when both pixels are switched can be avoided by incorporating a controlled oil motion e.g. by electromagnetic forces.

BRIEF DESCRIPTION OF THE DRAWINGS

These and other aspects of the invention are apparent from and will be elucidated with reference to the embodiments described hereinafter.

In the drawings:

FIGS. 1a and 1b are diagrammatic cross-sections of a part of a display device, to show the principle on which a display device according to the invention is based, FIG. 2 is another diagrammatic cross-section of a part of a display device according to an exemplary embodiment of the invention, FIGS. 3a and 3b are diagrammatic cross-sections of a part of a display device according to an exemplary embodiment of the invention, while

DETAILED DESCRIPTION OF EXEMPLARY EMBODIMENTS

Figure 4:
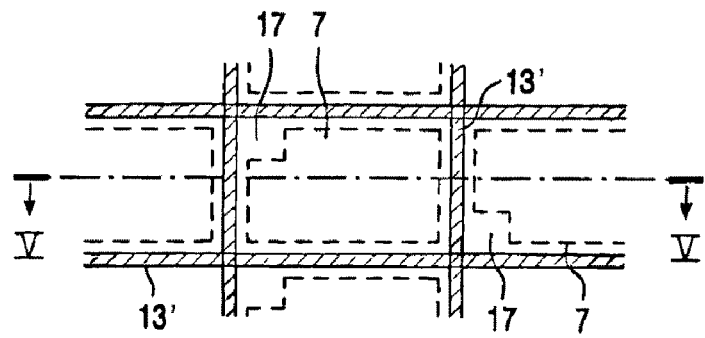
FIG. 4 is a plan view of a part of a further display device according to an exemplary embodiment of the invention.

FIGS. 1a and 1b show a diagrammatic cross-section of a part of a display device 1 which shows the principle on which a display device according to the invention is based. Between two transparent substrates or support plates 3, 4 a first fluid 5 and a second fluid 6 are provided, which are immiscible with each other. The first fluid 5 is for instance an alkane-like hexadecane or as in this example a (silicone) oil. The second fluid 6 is electroconductive or polar, for instance water or a salt solution (e.g., a solution of KCl in a mixture of water and ethyl alcohol).

In a first state, when no external voltage is applied (FIG. 1a) the fluids 5, 6 adjoin the first and second transparent support plates 3, 4 of e.g. glass or plastic. On the first support plate 3 a transparent electrode 7, for example indium (tin) oxide is provided and an intermediate less wettable (hydrophobic) layer 8, in this example an amorphous fluoropolymer (AF1600).

When a voltage is applied (voltage source 9) via interconnections 20, 21 the layer 5 moves aside or breaks up into small droplets (FIG. 1b). This occurs when the electrostatic energy gain is larger than the surface energy loss due to the creation of curved surfaces. As a very important aspect it was found that reversible switching between a continuous film 5 covering the support plate 3 and a film adjoining the wall 2 is achieved by means of the electrical switching means (voltage source 9).

FIG. 2 shows an embodiment of a display device according to the invention, in which walls between separate picture elements have been omitted for the greater part for the sake of clarity. In this embodiment the pixel walls 13 do not extend across the whole pixel thickness. Such walls may be obtained by offset printing or other printing techniques known in the art. It appears that the oil film 5 is very stable, which is enhanced even further as the pixel size decreases. So during switching the oil remains confined in each area. The other reference numerals have the same meaning as those in FIG. 1.

The layer 13 in this example is approximately 20 μm thick or less and consists of a lower part $13^b$, more wettable to the first fluid (hydrophobic) and an upper less wettable (hydrophilic) part $13^a$ (see FIGS. 3a and 3b). In this way the wetting of the lower part of the pixel wall by the oil ensures a homogeneous optical off-state. Then when the pixel is activated the reversibility of oil movement due to the less wettable (hydrophilic) upper part is also maintained. Especially the less wettable (hydrophilic) part (or a surface part) has been found to be essential for good switching.

The layer thickness of approximately 20 μm or less is a significant improvement with respect to the 80 μm layer, leading to an improved brightness and speed. Furthermore, due to the absence of glue, the oil covers the entire pixel area, improving the optical contrast. The layer 13 or layer parts $13^a$, $13^b$ in this example are printed. A printing process is very simple and flexible, thereby facilitating the fabrication of electrowetting displays at high resolutions significantly. In such a printing process it may be advantageous to use a pre-treatment of the substrate, such as a reactive ion-etching step using $O_2$ to make it more hydrophilic.

Figure 5:
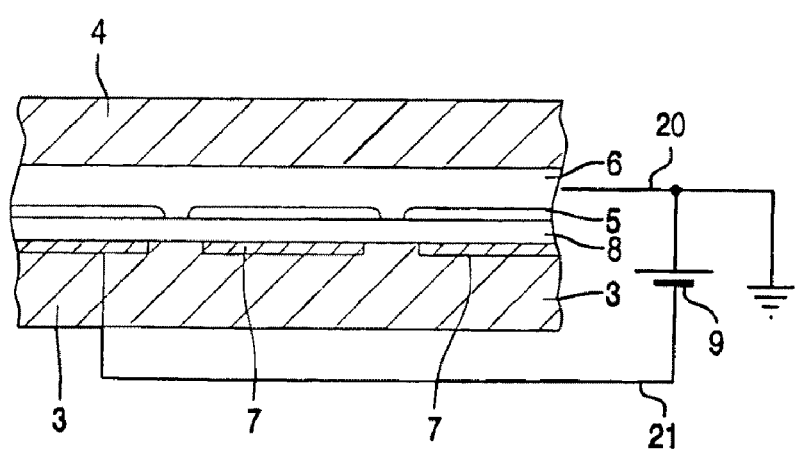
FIG. 5 is a diagrammatic cross-section along line V-V in FIG. 4.

In the display of FIGS. 4, 5 the separating area between pixel areas has been integrated into the substrate by making interpixel areas 13' of the substrate less wettable to the first fluid (hydrophilic) for instance by means of laser radiation, a UV-ozone treatment or an oxygen-plasma treatment. The further reference numerals in FIGS. 4, 5 have the same meaning as those in the other examples. The possibility of oil in adjacent pixels mixing when both pixels are switched to the transparent state is avoided by incorporating a controlled oil motion by electromagnetic control, in this case by leaving apertures 17 in the electrodes 7.

Several variations to the principle are possible. Although a transmissive device has been described, the display may be made reflective by adding a reflector as shown in element 14 in FIGS. 3a and 3b. The electrode configuration chosen here is merely an example. Other electrode configurations can be chosen, such as a circular geometry. Such a circular geometry is used in e.g., shutter applications and diaphragms.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

What is claimed is:

1. A display device comprising picture elements, each picture element having at least one first fluid and a second fluid immiscible with each other within a space of said picture element between a first transparent support plate and a second support plate, the second fluid being electroconductive or polar, the first fluid being confined to the space and the second fluid being shared between the picture elements,
    wherein said picture element has a surface area of at least one of the support plates that is less wettable to the second fluid, and
    areas having a more wettable surface area to the second fluid and arranged between the less wettable surface areas of neighboring picture elements.

2. A display device according to claim 1 in which the less wettable surface area is surrounded by said more wettable surface areas.

3. A display device according to claim 1 in which the first fluid of said picture element is switchable between a first state and a second state, the first fluid adjoining an edge of the less wettable surface area in the first state and in the second state.

4. A display device according to claim 1 in which the first fluid of said picture element is switchable between a first state and a second state, the first fluid adjoining the less wettable surface area and more wettable surface areas in the first state and in the second state.

5. A display device according to claim 1 provided with walls between the less wettable surface areas of neighboring picture elements, in which the more wettable surfaces are provided on the walls.

6. A display device according to claim 5, in which the first fluid is switchable between a first state and a second state, the first fluid adjoining a wall in said first state and in said second state.

7. A display device according to any one of claims 3, 4 or 6, wherein a zero voltage is applied between the second fluid and an electrode on said one support plate in said first state, and a non-zero voltage is applied between the second fluid and said electrode in said second state.

8. A display device according to claim 5, in which the lower parts of the walls are less wettable to the second fluid.

9. A display device according to claim 5 in which the walls have a height of at most 20 μm.

10. A method for manufacturing a display device according to any one of claims 1, 2, 3, 4 or 5 in which at least part of said one support plate is made more wettable to the second fluid by means of laser radiation, a UV-ozone treatment or an oxygen-plasma treatment.

11. A method for manufacturing a display device according to claim 10 in which said one support plate is provided with walls by means of a mold.

12. A method according to claim 11 in which said one support plate is pre-treated by means of reactive ion-etching.

13. A method for manufacturing a display device according to any one of claims 1, 2, 3, 4 or 5 in which the more wettable part to the second fluid of said one support plate is made by means of a printing method.

* * * * *